United States Patent
Oyama et al.

(10) Patent No.: US 10,719,113 B2
(45) Date of Patent: Jul. 21, 2020

(54) CONTROL DEVICE AND ELECTRONIC APPARATUS

(71) Applicant: Socionext Inc., Yokohama-shi, Kanagawa (JP)

(72) Inventors: Takashi Oyama, Yokohama (JP); Kuniaki Iwano, Yokohama (JP); Masakazu Sato, Yokohama (JP); Soichi Hagiwara, Komae (JP)

(73) Assignee: SOCIONEXT INC., Yokohama (JP)

( * ) Notice: Subject to any disclaimer, the term of this patent is extended or adjusted under 35 U.S.C. 154(b) by 91 days.

(21) Appl. No.: 15/130,090

(22) Filed: Apr. 15, 2016

(65) Prior Publication Data

US 2016/0231793 A1 Aug. 11, 2016

Related U.S. Application Data

(63) Continuation of application No. PCT/JP2014/059487, filed on Mar. 31, 2014.

(51) Int. Cl.
*G06F 1/26* (2006.01)
*G06F 1/3203* (2019.01)

(52) U.S. Cl.
CPC .............. *G06F 1/266* (2013.01); *G06F 1/26* (2013.01); *G06F 1/3203* (2013.01)

(58) Field of Classification Search
CPC ........... G06F 1/266; G06F 1/26; G06F 1/3203
USPC ......................................................... 713/300
See application file for complete search history.

(56) References Cited

U.S. PATENT DOCUMENTS

| 2005/0006483 A1* | 1/2005 | Fruhauf ............... G06F 1/24 235/492 |
| 2005/0240784 A1 | 10/2005 | Sugasawa |
| 2006/0139002 A1* | 6/2006 | Zemke ............. H02J 7/0055 320/128 |

(Continued)

FOREIGN PATENT DOCUMENTS

| JP | 2005-316593 | 11/2005 |
| JP | 2007-72907 | 3/2007 |

(Continued)

OTHER PUBLICATIONS

Japanese Office Action dated Dec. 6, 2016 in Japanese Patent Application No. 2016-511194.

(Continued)

*Primary Examiner* — Jaweed A Abbaszadeh
*Assistant Examiner* — Gayathri Sampath
(74) *Attorney, Agent, or Firm* — Staas & Halsey LLP

(57) ABSTRACT

When an electronic apparatus including a core chip and a hub controller chip is connected to an apparatus on the host side, a USB hub controller in the hub controller chip executes a process on a configuration between the USB hub controller and the apparatus on the host side and sets a limit value of power to be supplied, from a first limit value to a second limit value higher than the first limit value, and a VBUS current controller in the hub controller chip supplies the core chip with a power supply voltage generated based on a supplied power, which allows to maintain a configuration state between the apparatus on the host side and the USB hub controller at a time of starting up or at a time of class switching of the core chip and supply the core chip with the sufficient power.

3 Claims, 3 Drawing Sheets

(56) References Cited

U.S. PATENT DOCUMENTS

| | | | |
|---|---|---|---|
| 2007/0055805 A1 | 3/2007 | Hayashi et al. | |
| 2007/0088967 A1* | 4/2007 | Fu | G06F 1/266 |
| | | | 713/340 |
| 2007/0143505 A1* | 6/2007 | Terrell, II | G06F 1/266 |
| | | | 710/10 |
| 2009/0193156 A1 | 7/2009 | Suematsu | |
| 2009/0322306 A1* | 12/2009 | Warrington | H03K 5/13 |
| | | | 323/318 |
| 2011/0320837 A1 | 12/2011 | Suematsu | |
| 2013/0234677 A1* | 9/2013 | Mok | H02J 7/0052 |
| | | | 320/164 |
| 2015/0365237 A1* | 12/2015 | Soffer | H04L 9/3234 |
| | | | 726/20 |

FOREIGN PATENT DOCUMENTS

| | | |
|---|---|---|
| JP | 2009-176190 | 8/2009 |
| JP | 2012-8716 | 1/2012 |
| JP | 2012-59178 | 3/2012 |

OTHER PUBLICATIONS

Written Opinion of the International Searching Authority dated Jun. 3, 2014 in corresponding PCT Application No. PCT/JP2014/059487.
International Search Report dated Jun. 3, 2014 in corresponding PCT Application No. PCT/JP2014/059487.

* cited by examiner

F I G. 1
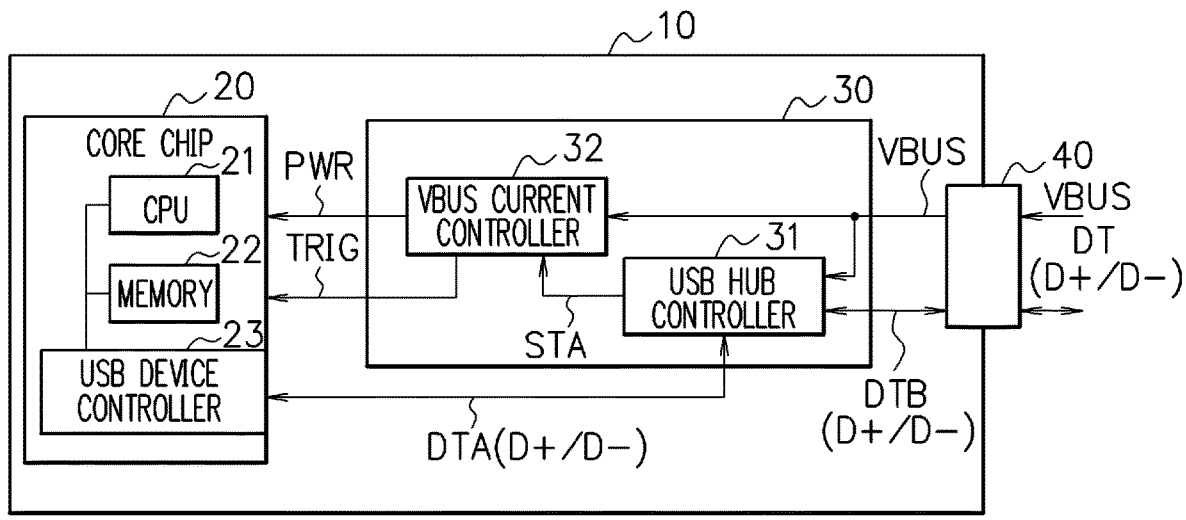
F I G. 2
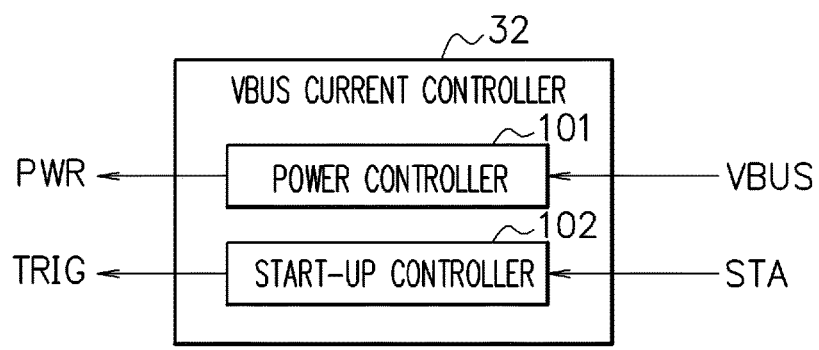
F I G. 3
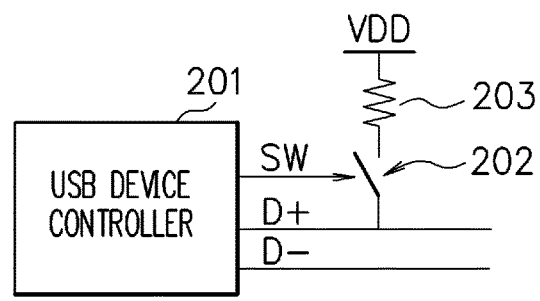

CONTROL DEVICE AND ELECTRONIC APPARATUS

CROSS-REFERENCE TO RELATED APPLICATION

This application is a continuation application of International Application PCT/JP2014/059487 filed on Mar. 31, 2014, and designated the U.S., the entire contents of which are incorporated herein by reference.

FIELD

The embodiments described herein relate to a control device and an electronic apparatus.

BACKGROUND

In recent years, a universal serial bus (USB) connectable battery-powered electronic apparatus such as a digital camera has generally dealt with being charged or fed with electric power by USB standard bus power (hereinafter, referred to as USB bus power). For example, some USB connected digital cameras can switch an operation mode including a charging mode, a playing mode, and a shooting mode during USB connection. This operation mode switching is accomplished by switching between plural pieces of USB device class information (configuration information) that the apparatus has.

There are difficulties as follows concerning these functions in an electronic apparatus including a chip which is relatively high in power consumption and includes a USB connecting function like a large-scale core chip which is formed into one chip including a USB device function.

A first difficulty is that the electronic apparatus may not be started up with only the USB bus power in a case where an electronic apparatus has no remaining battery charge. This is caused by the fact that power of 5V×500 mA at a maximum can be obtained with the USB bus power after configuration, but the power is limited to 5V×100 mA under the USB standard before the configuration, and thus, the configuration may not be executed unless the electronic apparatus is started up. That is, a large amount of power (large amount of current) may not be obtained with the USB bus power at the time of starting-up before the configuration and the electronic apparatus may not be started up owing to power shortage in the case of no remaining battery charge.

A second difficulty is that when USB device class switching is performed in a state where the electronic apparatus is operating, the class switching may not be performed owing to the power shortage in the case of no remaining battery charge of the electronic apparatus. This is caused by that because a USB is electrically disconnected and reconnected at the time of class switching, a configuration state is released into an initial state and a limitation on the power supplied by the USB bus power is lowered to 5V×100 mA or less.

The configuration is also referred to as enumeration, which is an initial process executed between a USB connected host apparatus (for example, personal computer) and a device apparatus (for example, digital camera). The process on the configuration is executed to establish a device class to be applied and to request power from the device apparatus to the host apparatus. Examples of the device class include a mass storage class used for USB memory and a human interface devices class used for USB mouse.

There is proposed a technology in which two USB connectors on the host side are used regarding a USB connected electronic apparatus to resolve shortage of the power supplied by the USB bus power (see Patent Document 1, for example). The above technology discloses a structure in which currents output respectively from the USB connectors on the host side are collectively supplied to the electronic apparatus such that power of 5V×1 A at a maximum can be supplied by the USB bus power after the configuration.

[Patent Document 1] Japanese Laid-open Patent Publication No. 2012-8716

SUMMARY

An aspect of a control device includes a first controller configured to execute a process on a configuration including a power request between the first controller and an external apparatus with receiving power of a first limit value from the external apparatus and to set a limit value of power to be supplied from the external apparatus to a second limit value higher than the first limit value when the control device is connected to the external apparatus which supplies power, and a second controller configured to supply a core chip with a power supply voltage generated based on power from the external apparatus, the core chip being configured to connect via the first controller with the external apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating a structural example of an electronic apparatus in an embodiment;

FIG. 2 is a diagram illustrating a structural example of a VBUS current controller in the embodiment;

FIG. 3 is a diagram illustrating an exemplary pull-up control of a data line in the embodiment;

DESCRIPTION OF EMBODIMENTS

Figure 4:
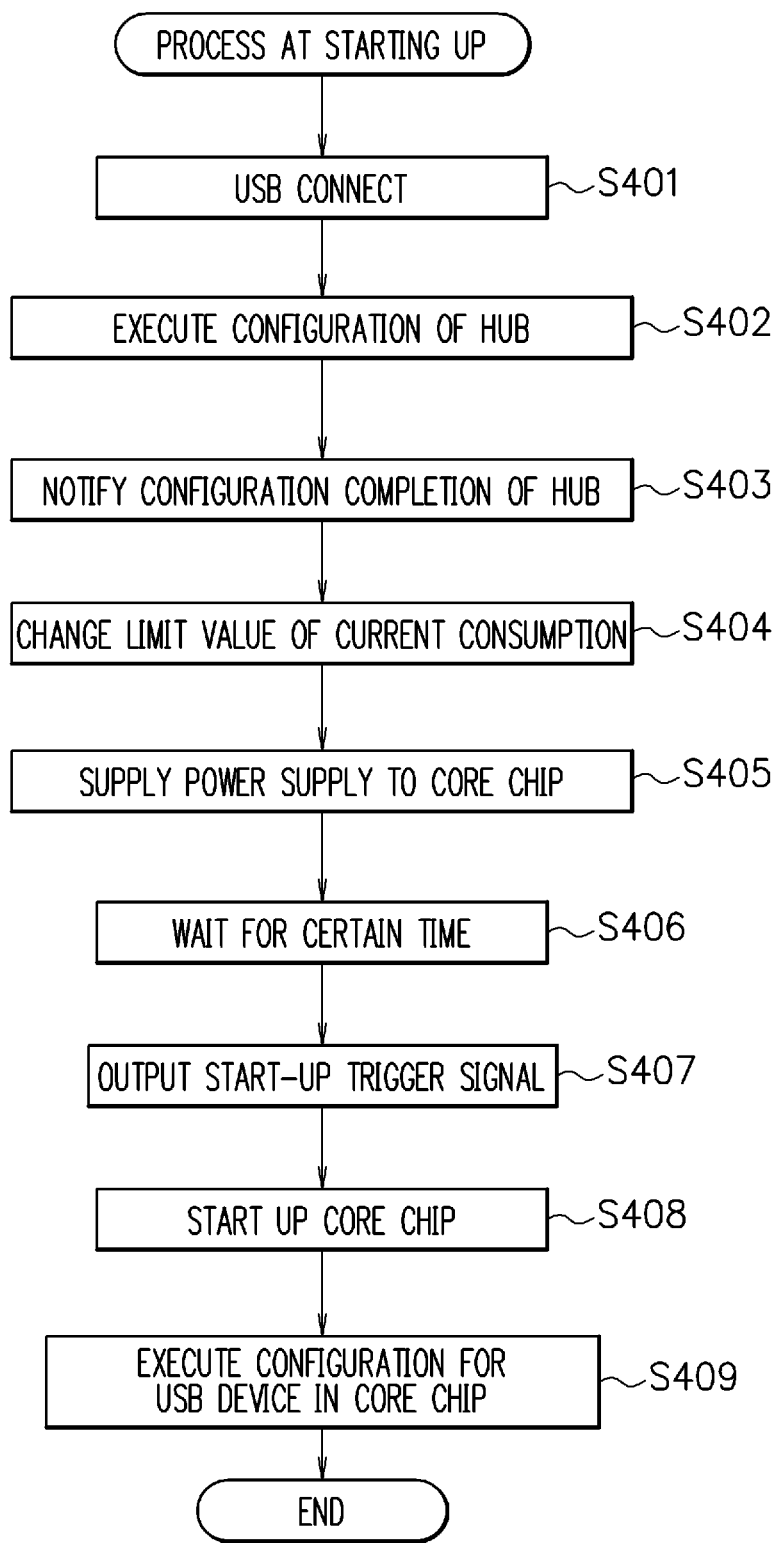
FIG. 4 is a flowchart illustrating an exemplary process at the time of starting up in the electronic apparatus in the embodiment.

Hereinafter, a description is given of an embodiment with reference to the drawings.

FIG. 1 is a block diagram illustrating a structural example of an electronic apparatus in an embodiment. An electronic apparatus 10 in the embodiment includes a core chip 20, a hub controller chip 30 as a control device, and a USB connector 40. The electronic apparatus 10 is USB-connected via the USB connector 40 with an external apparatus as a host apparatus (for example, personal computer or the like) not illustrated in the figure.

The core chip 20 is a core chip formed into one chip including a USB device function. The core chip 20 is relatively high in power consumption and may not operate with power of 5V×100 mA that is a maximum power in an initial state supplied by a USB bus power, including starting-up with a power shortage.

The core chip 20 receives from the hub controller chip 30 power supply via a power supply line PWR. A start-up trigger signal TRIG is input to core chip 20 from the hub controller chip 30. The core chip 20 is connected with the hub controller chip 30 via a first data line DTA (D+/D−) to transmit and receive data.

The core chip 20 includes a central processing unit (CPU) 21, a memory 22, and a USB device controller 23 which are connected with each other via a bus in the chip (On Chip Bus). The CPU 21 reads out and executes a program stored in the memory 22 to perform one or more processes. The memory 22 stores therein the program executed by the CPU 21, data or the like. The USB device controller 23 controls a USB connection state of the core chip 20, transmits and receives the data.

The hub controller chip 30 includes a USB hub controller 31 and a VBUS current controller 32. The USB hub controller 31 operates with power (bus power) supplied by way of a power supply line VBUS. The USB hub controller 31 is operable with power of 5V×100 mA or less that is a power limitation in the initial state supplied by the USB bus power.

In the USB hub controller 31, the first data line DTA (D+/D−) is connected to a USB port on the downstream side and a second data line DTB (D+/D−) is connected to a USB port on the upstream side. The USB hub controller 31 transmits and receives the data via the first data line DTA or the second data line DTB. The USB hub controller 31 transmits the data from the first data line DTA to the second data line DTB or transmits the data from the second data line DTB to the first data line DTA.

The USB hub controller 31 has a self-configuration function to execute the configuration between the host side and the apparatus when connected to the host side without receiving any instruction or the like from the core chip 20. The USB hub controller 31 outputs a state notifying signal STA indicating whether or not the configuration is completed between the host side and the apparatus. The state notifying signal STA is a digital signal by which, for example, "0" is output in an uncompleted-configuration state and "1" is output in a state where the configuration is completed.

The VBUS current controller 32 performs, depending on the configuration state of the USB hub controller 31, VBUS current control and, power supply control and start-up trigger control with respect to the core chip 20. As illustrated in FIG. 2, the VBUS current controller 32 includes a power controller 101 and a start-up controller 102.

The power controller 101 generates power supplied to the core chip 20 on the basis of the power (bus power) supplied by way of the power supply line VBUS and supplies the generated power by way of the power supply line PWR. The power controller 101 includes a DC-DC converter for power generation, as needed.

In the embodiment, the limitation on the power (bus power) supplied by way of the power supply line VBUS from the outside is 5V×100 mA in the initial state, and is changed to 5V×500 mA when the configuration of the USB hub controller 31 is completed. Therefore, in the embodiment, when the configuration of the USB hub controller 31 is completed, the core chip 20 can be supplied, via the power supply line PWR, with the power supply generated based on the power of 5V×500 mA at a maximum which is supplied by way of the power supply line VBUS.

The power controller 101 has a function to switch a limit value on a VBUS current depending on the configuration state of the USB hub controller 31. In other words, in a case where the state notifying signal STA from the USB hub controller 31 is "0" (uncompleted-configuration state), the power controller 101 controls the operation so that a current consumption value for the power supply line VBUS including a current consumption for the USB hub controller 31 does not exceed 100 mA. In a case where the state notifying signal STA from the USB hub controller 31 is "1" (configuration complete state), the power controller 101 controls the operation so that the current consumption value for the power supply line VBUS including the current consumption for the USB hub controller 31 does not exceed 500 mA.

The start-up controller 102 controls start-up of the core chip 20 depending on the configuration state of the USB hub controller 31. The start-up controller 102 receives the state notifying signal STA output from the USB hub controller 31 and outputs the start-up trigger signal TRIG to the core chip 20. The start-up controller 102 has a timer function to output the start-up trigger signal TRIG after a certain time elapses from a time when the configuration completion of the USB hub controller 31 is notified by the state notifying signal STA (the value changes from "0" to "1"). The start-up trigger signal TRIG is, for example, a power-on reset signal with respect to the core chip 20.

The USB connector 40 is a connecter which connects between the power supply line VBUS inside the electronic apparatus 10 and an external power supply line VBUS on the host side by way of which the bus power is supplied complying with the USB standard, and connects between the second data line DTA (D+/D−) inside the electronic apparatus 10 and an external data line DT (D+/D−) on the host side.

The electronic apparatus 10 illustrated in FIG. 1 handles the core chip 20 having the USB device function and the hub controller chip 30 having the USB hub controller 31 as a power supply system of one device such that the power supplied by way of the power supply line VBUS is controlled depending on the configuration state of the USB hub controller 31. When the configuration of the USB hub controller 31 is completed, the power of 5V×500 mA at a maximum is supplied by way of the power supply line VBUS, the power supply generated based on which power can be supplied via the power supply line PWR to the core chip 20.

Then, after the configuration is completed between the apparatus on the host side and the USB hub controller 31, an instruction to start up the core chip 20 is issued in a state where the configuration state is maintained. Accordingly, the core chip 20 can be started up in a state where the core chip 20 is supplied with the power supply generated based on the power of 5V×500 mA at a maximum which is supplied by way of the power supply line VBUS, that is, in a state where sufficient power is supplied to the core chip 20.

In the embodiment, at the time of USB device class switching in the core chip 20, the control is performed such that the configuration state between the apparatus on the host side and the USB hub controller 31 is maintained, and only the first data line DTA between the core chip 20 and the USB hub controller 31 is subjected to bus reset for making reconnection. Accordingly, the USB device class switching in the core chip 20 can be performed in a state where the core chip 20 is supplied with the power supply generated based on the power of 5V×500 mA at a maximum which is supplied by way of the power supply line VBUS, that is, in a state where sufficient power is supplied to the core chip 20.

For example, as illustrated in FIG. 3, a data line D+ connected to a USB device controller 201 is connected via a switch 202 and a pull-up resistor 203 with a high-pressure side power supply VDD. In a case where the data line is subjected to the bus reset, the switch 202 is set to an open state (off state, non-conducted state) by a control signal SW output from the USB device controller 201 to disable pull-up of the data line D+, and in a case where the bus reset of the data line is canceled, the switch 202 is set to a close state (on state, conducted state) by the control signal SW to enable the pull-up of the data line D+.

A description is given of a process at the time of starting up in the electronic apparatus 10 in the embodiment. FIG. 4 is a flowchart illustrating an exemplary process at the time of starting up in the electronic apparatus 10 in the embodiment.

The USB connector 40 in the electronic apparatus 10 is physically connected to the USB port on the host side to make USB connection (step S401). When the electronic apparatus 10 is USB connected, the power (limit value of 5V×100 mA) is supplied from the apparatus on the host side by way of the power supply line VBUS to the USB hub controller 31 and the VBUS current controller 32 in the hub controller chip 30.

Subsequently, the USB hub controller 31 is started up to automatically execute a process on the configuration between the USB hub controller 31 and the apparatus on the host side (step S402). Then, when the configuration between the apparatus on the host side and the USB hub controller 31 is completed, the USB hub controller 31 notifies the VBUS current controller 32 of the configuration completion by the state notifying signal STA (step S403).

The configuration completion between the apparatus on the host side and the USB hub controller 31 allows the limitation on the power to be changed to 5V×500 mA in response to a power request included in the configuration, the power being supplied from the apparatus on the host side by way of the power supply line VBUS. The VBUS current controller 32 notified of the configuration completion of the USB hub controller 31 by the state notifying signal STA changes, from 100 mA to 500 mA, the limit value of the current consumption from the power supply line VBUS including the current consumption for the USB hub controller 31 (step S404).

Then, the VBUS current controller 32 generates the power supply to be supplied to the core chip 20 on the basis of the power which is supplied by way of the power supply line VBUS and supplies the generated power supply (step S405). After that, the VBUS current controller 32 is put into a standby state until a certain time has elapsed (step S406), and when a certain time elapses, the start-up trigger signal TRIG is output to the core chip 20 (step S407).

The core chip 20 receiving the start-up trigger signal TRIG from the VBUS current controller 32 executes a start-up program to make starting up (step S408). Subsequently, the USB device controller 23 in the started up core chip 20 executes the process on the configuration with respect to the apparatus on the host side through the USB hub controller 31 (step S409) to complete the process at the time of starting up.

In this way, at the time of starting up of the core chip 20 included in the electronic apparatus 10, the core chip 20 can be supplied with the power supply generated based on the power of 5V×500 mA at a maximum which is supplied by way of the power supply line VBUS, which makes it possible to start up the core chip 20 with the power supplied by way of the power supply line VBUS to execute the process on the configuration.

Figure 5:
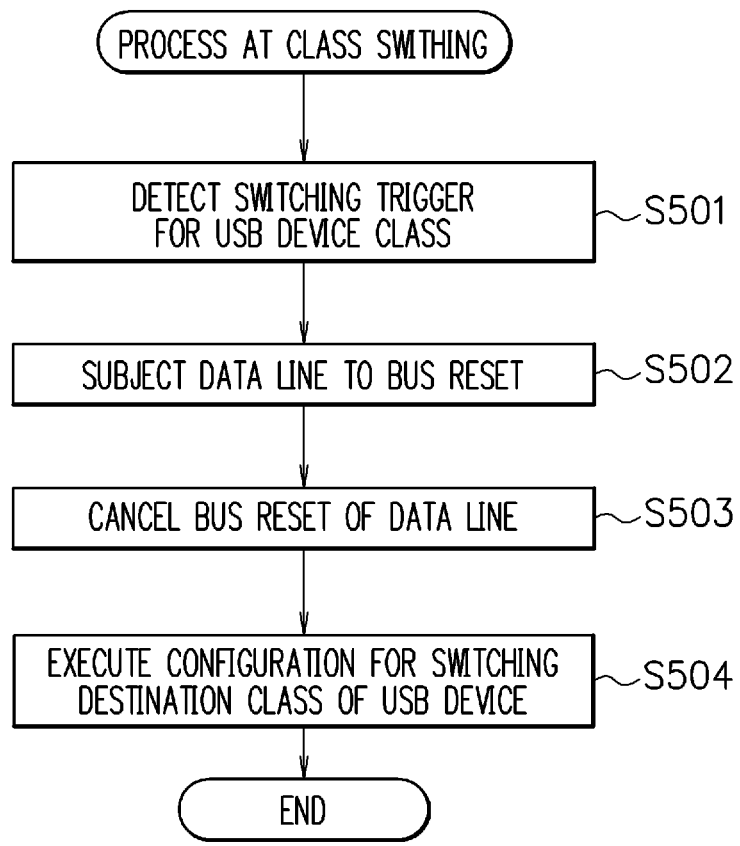
FIG. 5 is a flowchart illustrating an exemplary process at the time of class switching in the electronic apparatus in the embodiment.

Next, a description is given of a process at the time of class switching in the electronic apparatus 10 in the embodiment. FIG. 5 is a flowchart illustrating an exemplary process at the time of class switching in the electronic apparatus 10 in the embodiment.

The CPU 21 in the core chip 20 included in the electronic apparatus 10 detects a switching trigger for the USB device class during the operation with the power supply which is generated based on the power supplied by way of the power supply line VBUS (step S501). Here, the CPU 21 detects, as the switching trigger for the USB device class, that a mode switching operation is made through a switch pressing operation by a user or the like, for example.

When the CPU 21 detects the switching trigger, the USB device controller 23 inside the core chip 20 subjects the first data line DTA to the bus reset according to an instruction from the CPU 21 (step S502). The bus reset of the first data line DTA is attained by disabling the pull-up of the first data line DTA (D+), for example. At this time, the second data line DTB is not subjected to the bus reset and maintains a connected state.

Next, the USB device controller 23 cancels the bus reset of the first data line DTA according to the instruction from the CPU 21 (step S503). The USB device controller 23 notifies the apparatus on the host side, through the USB hub controller 31, of a descriptor corresponding to a switching destination class, and executes the process on the configuration with respect to the apparatus on the host side (step S504) to complete the process at the time of class switching.

In this way, at the time of class switching in the electronic apparatus 10, the configuration state between the apparatus on the host side and the USB hub controller 31 is maintained, which makes it possible to maintain the state where the core chip 20 is supplied with the power supply generated based on the power of 5V×500 mA at a maximum which is supplied by way of the power supply line VBUS. Accordingly, the class switching can be performed without getting into a power shortage state.

The above embodiment describes the USB connected electronic apparatus as an example, but is not limited thereto. The embodiments can be applied to a structure, like a USB connected electronic apparatus, in which the limit value of the power externally supplied is low in the initial state, but the limit value of the power can be set higher after executing a process concerning a setting like the configuration.

Any of the embodiments merely describes only an example for embodying thereof in carrying out the embodiment, which is not construed to limit the technical scope of the embodiments. In other words, the embodiments can be implemented in various forms without departing from the technical idea thereof or the primary feature thereof.

When connected to the apparatus on the host side, a chip other than the core chip executes the process on the configuration with respect to the apparatus on the host side to set higher the limit value of the power to be supplied and supply the core chip with the power supply generated based on the power from the apparatus on the host side, which allows the core chip to be supplied with sufficient power even at the time of starting up or at the time of class switching. For example, even in a case of no remaining battery charge in a battery-powered electronic apparatus, the process of starting up or class switching of the electronic apparatus can be easily performed. Further, since the signal input to and output from the core chip is not changed even under the control like this, the control can be carried out without changing the structure of the core chip.

The disclosed control device, when connected to the external apparatus which supplies the power, executes the process on the configuration and sets the limit value of the power to be supplied from the external apparatus to a second limit value higher than a first limit value to supply the core chip with the power supply generated based on the power from the external apparatus, which allows the core chip to be supplied with sufficient power even at the time of starting up or at the time of class switching.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An electronic apparatus, comprising:
   a core chip configured to connect with an external apparatus; and
   a control device configured to supply the core chip with a power supply voltage generated based on power which is supplied from the external apparatus, wherein the control device includes:
   a first controller configured to,
   execute a process on a configuration including a power request to the external apparatus between the first controller and the external apparatus while receiving power of a first limit value from the external apparatus, when the control device is connected to the external apparatus which supplies power, and
   set a limit value of power to be supplied from the external apparatus to a second limit value higher than the first limit value when the process on the configuration is completed,
   the first limit value being an initial value determinable between the control device and the external apparatus, the second limit value being determinable between the control device and the external apparatus and being settable after the configuration is completed; and
   a second controller configured to supply the core chip with the power supply voltage in a state where a state of the configuration between the first controller and the external apparatus is maintained, and
   wherein
   the core chip is configured to execute a process on a configuration associated with switching between device classes of the core chip in the maintained state of being supplied with the power supply voltage from the second controller so as to be connected via the control device to the external apparatus,
   the second controller is configured to output a signal which causes the core chip to start up after a first time elapses from a time when the process on the configuration between the first controller and the external apparatus is completed, and
   at a time of the switching between device classes of the core chip where both the configuration between the first controller and the external apparatus and a process through the first controller on a configuration between the core chip and the external apparatus are completed, the first controller is configured to maintain the state of the configuration between the first controller and the external apparatus and reset a state of a configuration between the first controller and the core chip,
   wherein the core chip is configured to perform the reset by a bus reset of a data line between the first controller and the core chip where the state of the configuration process between the first controller and the external apparatus is maintained, cancel the bus reset of the data line, and cause execution of the process on the configuration associated with the switching between device classes of the core chip.

2. The electronic apparatus according to claim 1, wherein the external apparatus and the control device are connected with each other via a bus complying with a USB standard.

3. The electronic apparatus according to claim 1, wherein the core chip is configured to execute a process on a configuration associated with the start-up in the maintained state of being supplied with the power supply voltage from the second controller.

* * * * *